United States Patent
Takada et al.

(10) Patent No.: US 10,493,983 B2
(45) Date of Patent: Dec. 3, 2019

(54) VEHICLE DRIVING SUPPORT SYSTEM

(71) Applicants: TOYOTA JIDOSHA KABUSHIKI KAISHA, Toyota-shi, Aichi-ken (JP); NATIONAL UNIVERSITY CORPORATION NAGOYA UNIVERSITY, Nagoya-shi, Aichi-ken (JP)

(72) Inventors: Hiroaki Takada, Nagoya (JP); Yousuke Watanabe, Nagoya (JP); Shigeharu Teshima, Nagoya (JP); Yoshiki Ninomiya, Nagoya (JP); Kenya Sato, Nagoya (JP)

(73) Assignees: TOYOTA JIDOSHA KABUSHIKI KAISHA, Toyota (JP); NATIONAL UNIVERSITY CORPORATION NAGOYA UNIVERSITY, Nagoya-shi (JP)

(*) Notice: Subject to any disclaimer, the term of this patent is extended or adjusted under 35 U.S.C. 154(b) by 75 days.

(21) Appl. No.: 15/012,165

(22) Filed: Feb. 1, 2016

(65) Prior Publication Data
US 2016/0236682 A1 Aug. 18, 2016

(30) Foreign Application Priority Data
Feb. 13, 2015 (JP) ................. 2015-026913

(51) Int. Cl.
*B60W 30/09* (2012.01)
*G01S 13/86* (2006.01)
(Continued)

(52) U.S. Cl.
CPC ............ *B60W 30/09* (2013.01); *G01S 13/86* (2013.01); *G01S 13/931* (2013.01);
(Continued)

(58) Field of Classification Search
CPC .............. B60W 10/184; B60W 30/09; B60W 2550/10; G05D 1/024; G01S 13/86; G01S 13/931; G01S 13/04; G01S 19/13
See application file for complete search history.

(56) References Cited

U.S. PATENT DOCUMENTS

| 6,459,991 | B1 | 10/2002 | Takiguchi et al. |
| 2012/0182392 | A1* | 7/2012 | Kearns .................. B25J 11/009 348/46 |

(Continued)

FOREIGN PATENT DOCUMENTS

| CN | 103842229 A | 6/2014 |
| JP | 2001-126199 A | 5/2001 |

(Continued)

*Primary Examiner* — Christian Chace
*Assistant Examiner* — Aaron C Smith
(74) *Attorney, Agent, or Firm* — Oliff PLC

(57) ABSTRACT

A vehicle driving support system includes a detection part detecting an object; an area classification part classifying areas other than a presence area where the object detected by the detection part is present into an empty area and an unknown area, the empty area being such an area that it is determined that no object is present and an unknown area being such an area that whether an object is present is unknown; and a control part guiding a vehicle to the empty area.

7 Claims, 11 Drawing Sheets

(51) Int. Cl.
*G01S 13/93* (2006.01)
*G01S 19/13* (2010.01)
*G01S 13/04* (2006.01)

(52) U.S. Cl.
CPC .......... *B60W 2550/10* (2013.01); *G01S 13/04* (2013.01); *G01S 19/13* (2013.01)

(56) References Cited

U.S. PATENT DOCUMENTS

| | | | | |
|---|---|---|---|---|
| 2013/0082874 A1* | 4/2013 | Zhang | ............... | G01S 5/0072 342/357.31 |
| 2013/0261948 A1 | 10/2013 | Funabashi | | |
| 2014/0244114 A1* | 8/2014 | Matsubara | ............. | G05D 1/024 701/41 |

FOREIGN PATENT DOCUMENTS

| | | |
|---|---|---|
| JP | 2007-128300 A | 5/2007 |
| JP | 2009-187413 A | 8/2009 |
| JP | 2012-238151 A | 12/2012 |
| JP | 2013-092932 A | 5/2013 |
| JP | 2013-205960 A | 10/2013 |
| WO | 2013/051081 A1 | 4/2013 |

\* cited by examiner

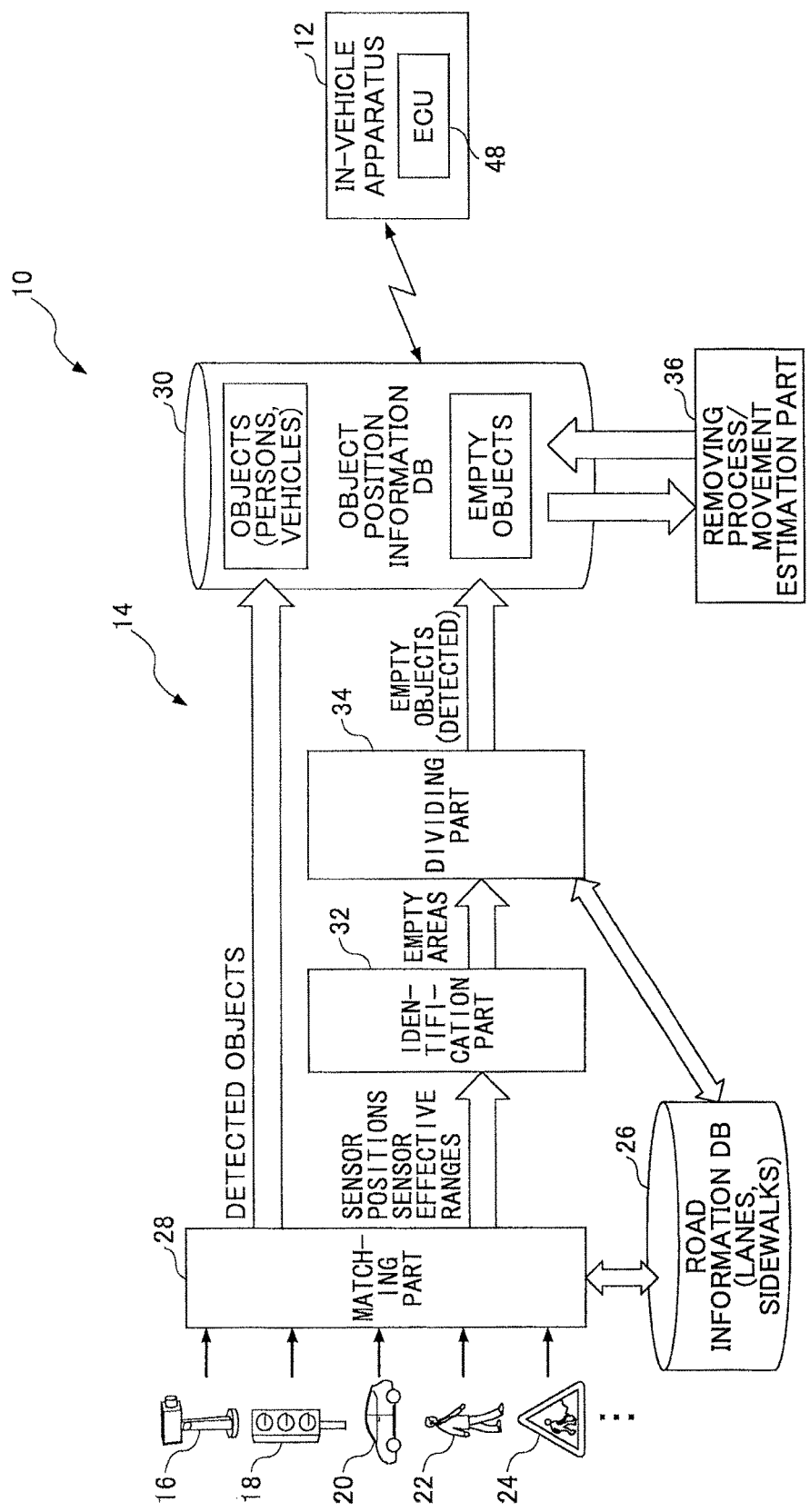

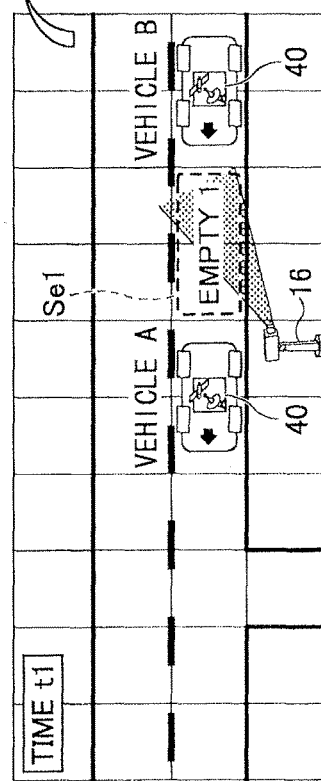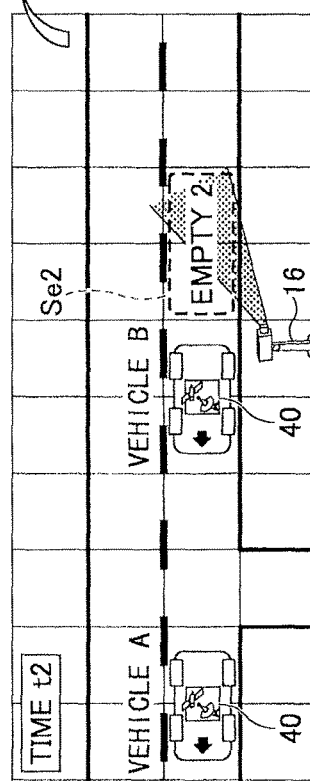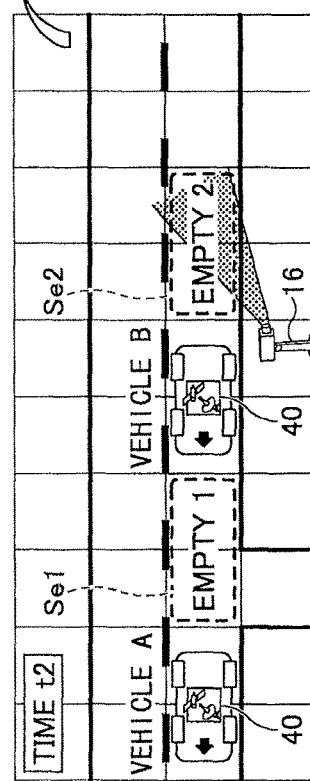
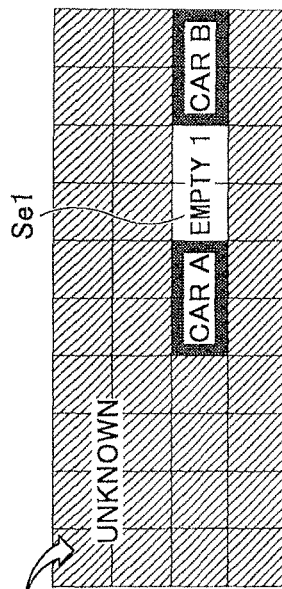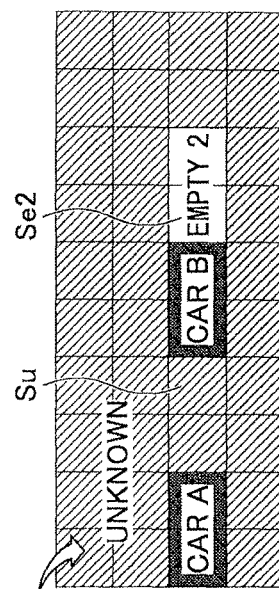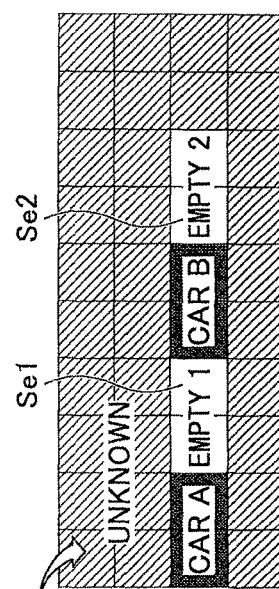
FIG.7A  FIG.7B  FIG.7C

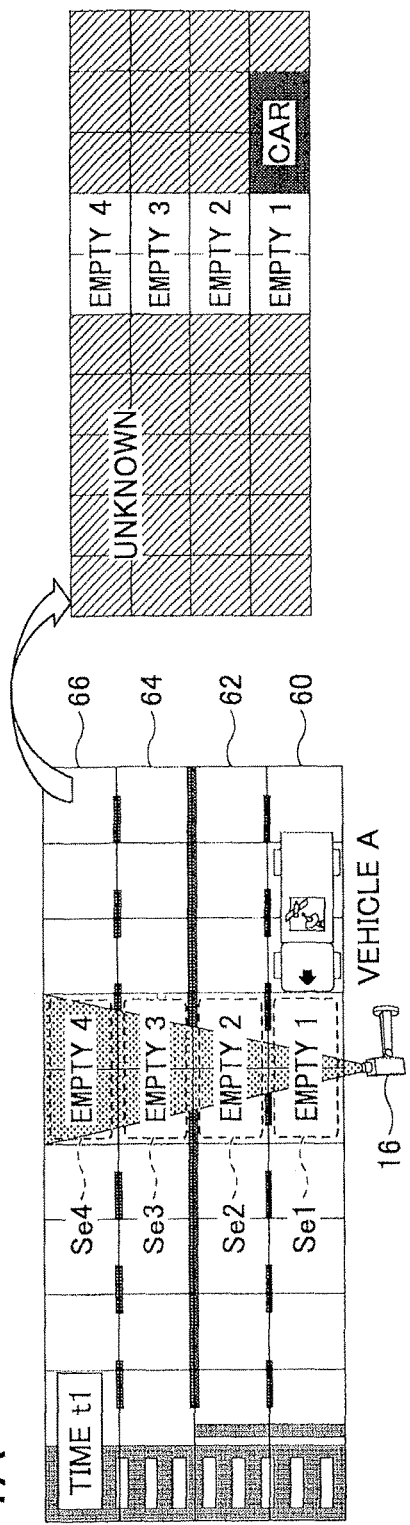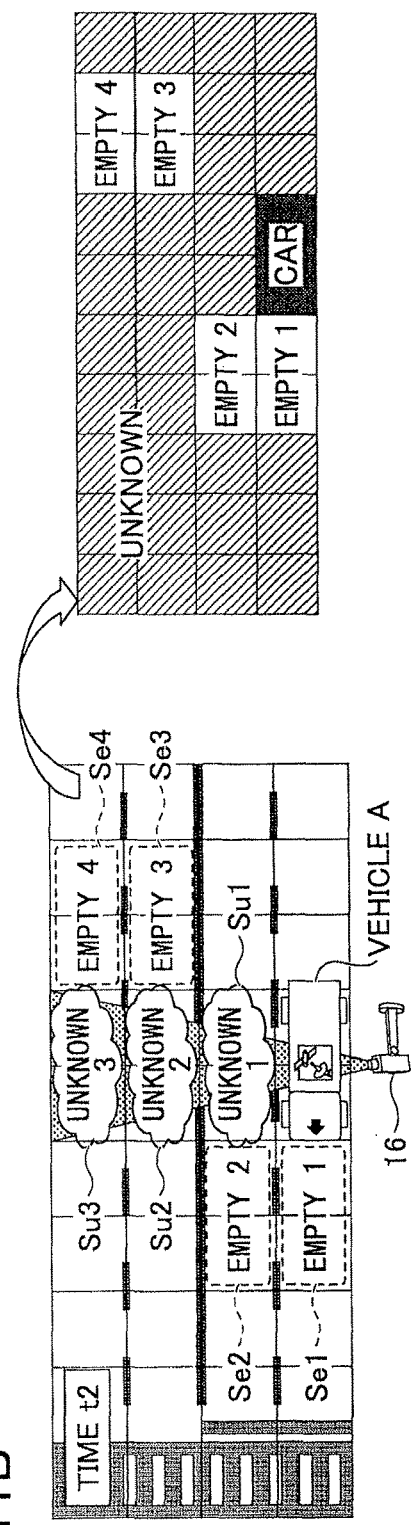

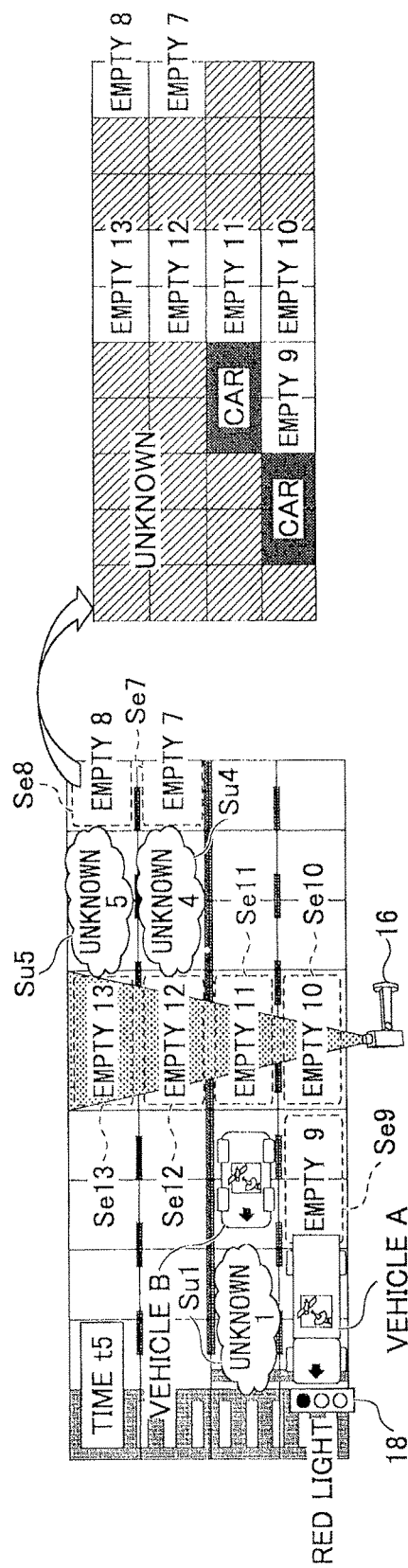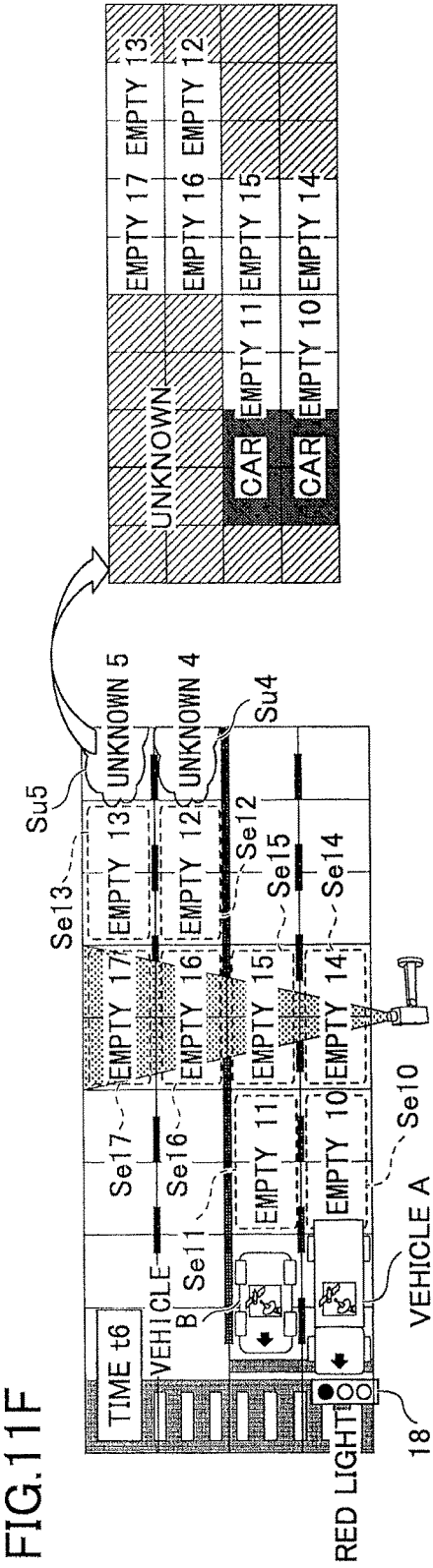
FIG.11E
FIG.11F

VEHICLE DRIVING SUPPORT SYSTEM

BACKGROUND OF THE INVENTION

1. Field of the Invention

The present invention relates to a vehicle driving support system.

2. Description of the Related Art

In the related art, a vehicle driving support system is known (for example, see Japanese Laid-Open Patent Application No. 2001-126199) carrying out vehicle driving support control. The system includes a detection apparatus outside a vehicle, and an on-vehicle apparatus installed in the vehicle. The detection apparatus detects an object on a road such as another vehicle, and sends corresponding information to the on-vehicle apparatus. Based on the detected object thus acquired from the detection apparatus, the on-vehicle apparatus carries out driving support control to avoid a collision with the object.

SUMMARY OF THE INVENTION

According to one aspect of the present invention, a vehicle driving support system includes a detection part detecting an object; an area classification part classifying areas other than a presence area where the object detected by the detection part is present into an empty area and an unknown area, the empty area being such an area that it is determined that no object is present and an unknown area being such an area that whether an object is present is unclear; and a control part guiding a vehicle to the empty area.

Other objects, features and advantages of the present invention will become more apparent from the following detailed description when read in conjunction with the accompanying drawings.

BRIEF DESCRIPTION OF THE DRAWINGS

FIG. 1 is a configuration diagram of a vehicle driving support system according to one embodiment;

FIGS. 7A-7C illustrate one example of a method of moving an empty area according to the present embodiment;

FIGS. 11A-11F illustrates a method of moving an empty area and an unknown area according to a variant.

DETAILED DESCRIPTION OF THE EMBODIMENTS

Figure 2A:
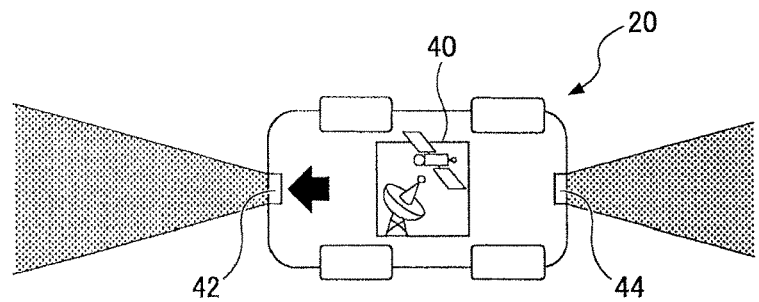
FIGS. 2A and 2B illustrate an area setting method in a case where a vehicle includes a self-position detection apparatus and a surrounding environment recognition apparatus according to the present embodiment.

For the purpose of convenience, the description of the above-mentioned related art will be continued first.

In the vehicle driving support control, it is preferable that the detection apparatus detects all the events in the road traffic environments. However, generally speaking, the events in the road traffic environments are only partially detected. Note that all the area other than a presence area where an object detected by the detection apparatus is present includes an area where no object is present (hereinafter, referred to as an "empty area") and an area where whether an object is present is unknown (hereinafter, referred to as an "unknown area"). Although guiding a vehicle to an unknown area is not too preferable, guiding a vehicle to an empty area is preferable. However, according to the above-mentioned system in the related art, the on-vehicle apparatus carries out such driving support control as to carry out braking operation to avoid a collision with an object upon detecting an object which may be an obstacle to the vehicle traveling by the detection apparatus, but does not carry out such driving support control as to guide a vehicle to an empty area where no object is present.

The embodiments have been devised in consideration of the above-described point, and an object is to provide a vehicle driving support system capable of carrying out high-grade driving support control by guiding a vehicle to an empty area that is included in an area other than a presence area where a detection apparatus detects an object and is distinguished from an unknown area.

Below, using the accompanying drawings, the actual embodiments of a vehicle driving support system will be described.

FIG. 1 is a configuration diagram of a vehicle driving support system 10 according to one embodiment. The vehicle driving support system 10 according to the present embodiment is a system that supports driving a vehicle. The vehicle driving support system 10 includes on-vehicle apparatuses 12 installed in respective vehicles, and a center 14 installed outside the vehicles.

Various sorts of information are input to the center 14. For example, information transmitted by sensors 16 such as sensors and/or cameras installed at sides of roads, above the roads, or so, information transmitted from road signals 18, information transmitted from the respective vehicles 20, information transmitted from portable terminals 22 held by persons, roadworks information given by a road management center 24, or so, and so forth, are input to the center 14. These sorts of information are information mainly indicating positions. For example, positions of objects, positions of roadworks, and so forth, on a road map, are included. Also, the information from the sensors 16 includes information indicating positions of monitoring target areas of the sensors 16 on the road map, and information indicating whether objects such as vehicles, persons, and so forth, are present in the monitoring target areas. The information from the road signals 18 includes information indicating the current states of the road signals 18 such as allowing or prohibiting entry, or so. The information from the vehicles 20 includes self-position information, and information indicating whether objects such as persons, other vehicles, or so, are present, detected by on-vehicle sensors such as radars, cameras, or so. The information from the vehicles 20 and the information from the portable terminals 22 can include predetermined unique identification information.

The center 14 includes a road information database 26 and a matching part 28. The road information database 26 stores information such as the road map, the number of lanes of each road, whether the road has a sidewalk, and so forth. The above-mentioned various sorts of information that are thus input to the center 14 are supplied to the matching part 28. The matching part 28 reads the information stored by the road information database 26, and generates current road traffic situation information by matching the various sorts of position information that are input to the center 14 with the road map.

The center 14 further includes a position information database 30, an identification part 32, and a dividing part 34. If it is detected that an object is present through the matching process by the matching part 28 based on the information from the sensor 16, the vehicle 20, or the portable terminal 22, the matching part 28 supplies information indicating an area where the object is present (hereinafter, referred to as a "presence area") to the position information database 30 and stores the information there. The position information database 30 stores the information indicating the position of the object supplied by the matching part 28.

The matching part 28 supplies the information indicating the input positions of the monitoring target areas of the sensors 16, and the input positions of the monitoring target areas of the on-vehicle sensors installed in the vehicle 20, to the identification part 32. Note that, the process of supplying the position information of the monitoring target areas from the matching part 28 to the identification part 32 is carried out except for the position information of the area where the detected object is present. The identification part 32 identifies an area (hereinafter, referred to as an "other-than-presence area") included in the entire area except the presence area where the detected object is present as the monitoring target areas of the sensors 16 and the on-vehicle sensors, and the area other than the monitoring target areas.

Actually, the identification part 32 first acquires the positions of the monitoring target areas of the sensors 16 and the on-vehicle sensors included in the other-than-presence area of the entire area except the presence area where the object is present based on the information acquired from the matching part 28. Thereafter, the identification part 32 acquires the positions of the areas other than the monitoring target areas by subtracting the monitoring target areas from the other-than-presence area After thus acquiring the positions of the monitoring target areas and the positions of the areas other than the monitoring target areas from the other-than-presence area, the identification part 32 supplies the position information (in particular, the position information of the monitoring target areas) to the dividing part 34. The dividing part 34 allocates the monitoring target areas included in the other-than-presence area, in grid units separated for the respective lanes and sidewalks, while reading the information stored by the road information database 26. After thus allocating the monitoring target areas included in the other-than-presence area in grid units, the dividing part 34 determines the monitoring target areas included in the other-than-presence area as initial positions of areas where it is determined that no object is present (hereinafter, referred to as, "empty areas"). Note that, empty areas are relatively safe spaces that can be used for traffic merging or lane changes by vehicles, or road crossing by persons.

Then, the identification part 32 supplies the thus generated grid-unit position information of the initial positions of the empty areas to the position information database 30 as the information generated based on the facts using the sensors 16 and so forth, and stores the information there.

Figure 2B:
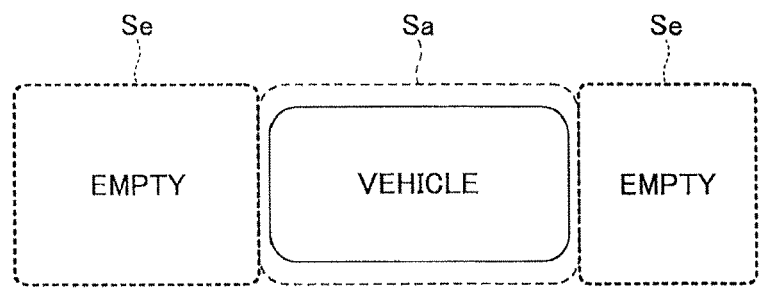
Figure 3A:
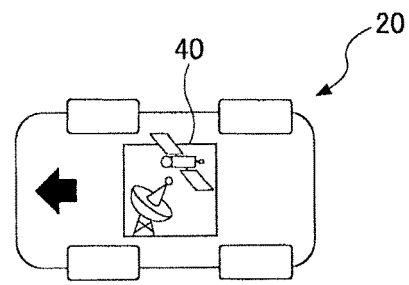
FIGS. 3A and 3B illustrate an area setting method in a case where a vehicle includes the self-position detection apparatus according to the present embodiment.
Figure 3B:
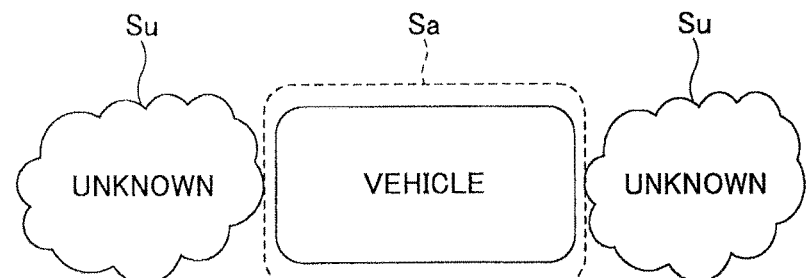
Figure 4A:
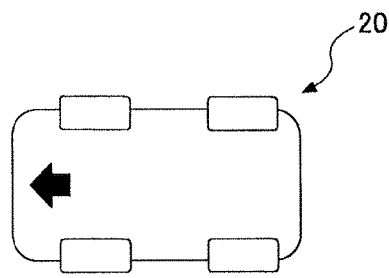
FIGS. 4A and 4B illustrate an area setting method in a case where a vehicle includes neither the self-position detection apparatus nor the surrounding environment recognition apparatus according to the present embodiment.
Figure 4B:
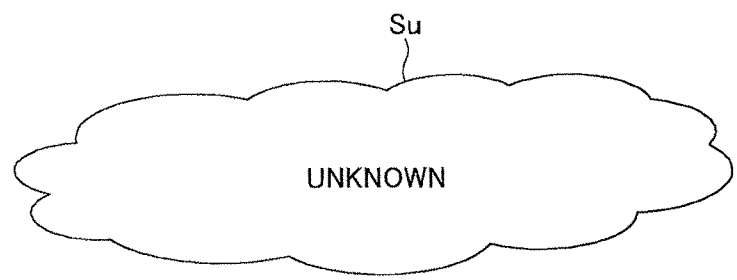
Figure 5A:
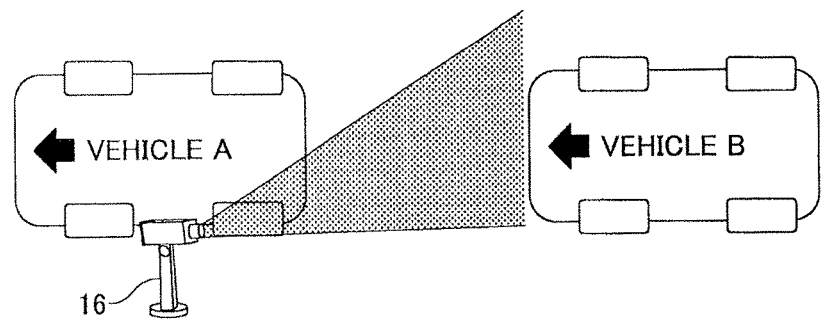
FIGS. 5A and 5B illustrate an area setting method in a case where a sensor is installed at a side of a road according to the present embodiment.
Figure 5B:
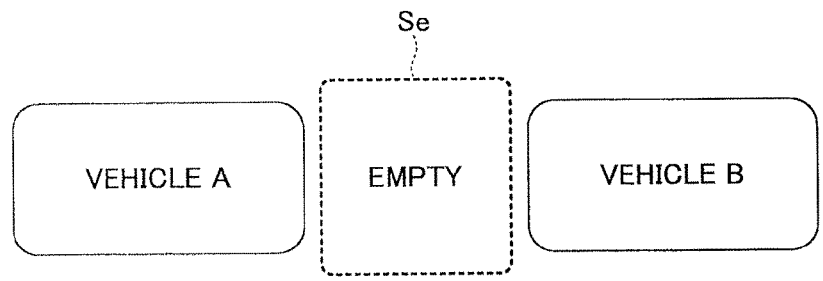
Figure 6A:
FIGS. 6A and 6B illustrate an area setting method in a case where no sensor is installed at a side of a road according to the present embodiment.
Figure 6B:
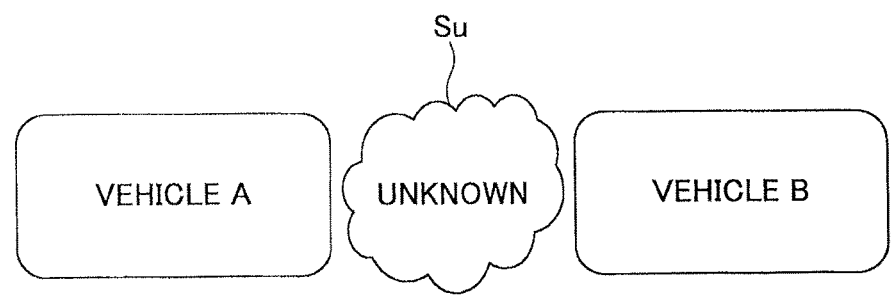

FIGS. 2A and 2B illustrate a method of area setting in a case where the vehicle 20 includes a self-position detection apparatus (GPS apparatus) 40 and surrounding environment recognition apparatuses (radar apparatuses) 42 and 44, according to the present embodiment. FIGS. 3A and 3B illustrate a method of area setting in a case where the vehicle 20 includes the GPS apparatus 40, according to the present embodiment. FIGS. 4A and 4B illustrate a method of area setting in a case where the vehicle 20 includes neither the GPS apparatus 40 nor the radar apparatuses 42 and 44, according to the present embodiment. FIGS. 5A and 5B illustrate a method of area setting in a case where the sensor 16 is installed at a side of a road, according to the present embodiment. FIGS. 6A and 6B illustrate a method of area setting in a case where the sensor 16 is not installed at a side of a road, according to the present embodiment. Note that, in FIGS. 2A-6B, each of FIGS. 2A, 3A, 4A, 5A and 6A schematically illustrates a situation of the vehicle 20. Each of FIGS. 2B, 3B, 4B, 5B and 6B schematically illustrates a situation recognized by the center 14.

For example, as shown in FIG. 2A, if the vehicle 20 includes the GPS apparatus 40 and the radar apparatuses 42 and 44, the vehicle 20 supplies information of self-position information of the vehicle 20 detected by the GPS apparatus 40, information indicating whether an object is present in a predetermined front area of the vehicle 20 detected by the radar apparatus 42, and information indicating whether an object is present in a predetermined rear area of the vehicle 20 detected by the radar apparatus 44, to the center 14 shown in FIG. 1. In this case, the center 14 detects that the vehicle 20 is present based on the information thus supplied by the vehicle 20, and stores the information indicating the position of the presence area Sa of the vehicle 20 in the position information database 30 (FIG. 2B).

If no object is present in the front area and the rear area of the vehicle 20, no information indicating that an object is present is supplied from the radar apparatuses 42 and 44 of the vehicle 20 to the center 14. In this case, the front area and the rear area of the vehicle 20 are the monitoring target areas of the radar apparatuses 42 and 44 included in the other-than-presence area, and the position information of the front area and the rear area is supplied to the center 14. Thereby, in this case, the center 14 further determines the front area and the rear area of the vehicle 20 as empty areas Se, respectively, and stores the position information of the empty areas Se in the position information database 30 (FIG. 2B).

For example, as shown in FIG. 3A, if the vehicle 20 includes the GPS apparatus 40, the vehicle 20 supplies the self-position information of the vehicle 20 detected by the GPS apparatus 40 to the center 14. In this case, the center 14 detects that the vehicle 20 is present, and stores information indicating the position of the presence area Sa of the vehicle 20 in the position information database 30 (FIG. 3B). If there is neither the sensors 16 nor the on-vehicle sensors of other vehicles monitoring the front area and the rear area of the vehicle 20, the center 14 determines the front area and the rear area of the vehicle 20 as areas Su, not the monitoring target areas of the sensor 16 and so forth, but areas where whether an object is present is unknown (hereinafter, referred to as, "unknown areas") (FIG. 3B). Note that the unknown areas are those other than the empty areas included in the other-than-presence area except the presence area, and are relatively unsafe spaces such that it is difficult to be used for traffic merging or lane changes by vehicles, or road crossing by persons.

For example, as shown in FIG. 4A, if the vehicle 20 includes neither the GPS apparatus 40 nor the radar apparatuses 42 and 44, the vehicle 20 supplies no information to the center 14. In this case, if there are neither the sensors 16 nor the on-vehicle sensors of other vehicles monitoring the position of the vehicle 20 and the front area and the rear area of the vehicle 20, the center 14 determines the position of the vehicle 20 and the front area and the rear area of the vehicle 20 as an unknown area Su (FIG. 4B).

For example, as shown in FIG. 5A, if the sensor 16 is installed at a side of a road, the sensor 16 supplies the position information of its monitoring target area and information indicating whether an object is present in the monitoring target area to the center 14. In this case, the center 14 determines the position of the monitoring target area of the sensor 16, and determines whether an object is present in the monitoring target area. Then, if the center 14 has determined that an object is present in the monitoring target area of the sensor 16, the center 14 determines this monitoring target area as a presence area where an object is present, and stores information indicating the position of the presence area where the object is present in the position information database 30. On the other hand, if it is determined that no object is present in the area, for example, between the vehicle A and the vehicle B, that is the monitoring target area of the sensor 16, the center 14 determines this monitoring target area as an initial position of an empty area Se, and stores the information indicating the initial position of the empty area Se in the position information database 30 (FIG. 5B).

Also, for example, as shown in FIG. 6A, if no sensor 16 is installed at a side of a road, neither the position information of the monitoring target area of the sensor 16 nor information indicating whether an object is present in the monitoring target area is supplied to the center 14. In this case, if there are neither the sensor 16 nor the on-vehicle sensor of another vehicle monitoring the area, for example, between the vehicle A and the vehicle B, the center 14 determines the area between the vehicle A and the vehicle B as an unknown area Su (FIG. 6B).

According to the present embodiment, the center 14 further includes a removing process/movement estimation part 36. The removing process/movement estimation part 36 is connected to the position information database 30. The removing process/movement estimation part 36 moves an empty area Se stored in the position information database 30 on the road map to estimate the position thereof, and removes the empty area Se, and, according to these operations, the removing process/movement estimation part 36 updates the position information of the empty area Se in the position information database 30.

The operation of moving the empty area Se by the removing process/movement estimation part 36 is to move the empty area Se on the road map with time. Actually, the moving operation is carried out in accordance with physical rules and traffic rules. Also, it is sufficient that, as to respective areas having different traffic rules such as different lanes, sidewalks, and so forth, separate empty areas are determined therefor, and then, the estimation of moving thereof is made for each empty area, separately. For example, a movement of an empty area on a highway road is made in a predetermined direction for each lane, and is made within a speed range between the legal lower and upper limits. A movement of an empty area on a secondary road is made also in a predetermined direction for each lane, and is made within a speed range between the zero speed and the legal upper limit. No movement of an empty area is made on a sidewalk, or, it is also possible that an empty area on a sidewalk itself reduces with time. Further, if an empty area Se is sandwiched between a vehicle A and a vehicle B as shown in FIG. 5B, it is sufficient that a movement of the empty area Se is made according to the speed of the vehicle A or the speed of the vehicle B while the empty area Se is constantly present between the vehicle A and the vehicle B.

Figure 8A:
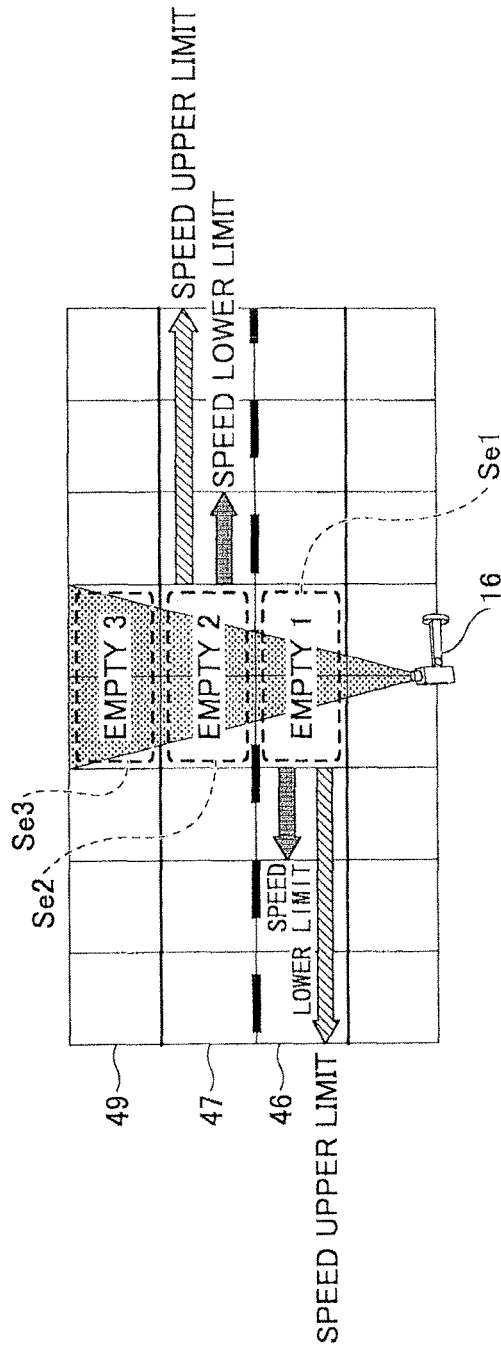
FIGS. 8A and 8B illustrate another example of a method of moving an empty area in the present embodiment.
Figure 8B:
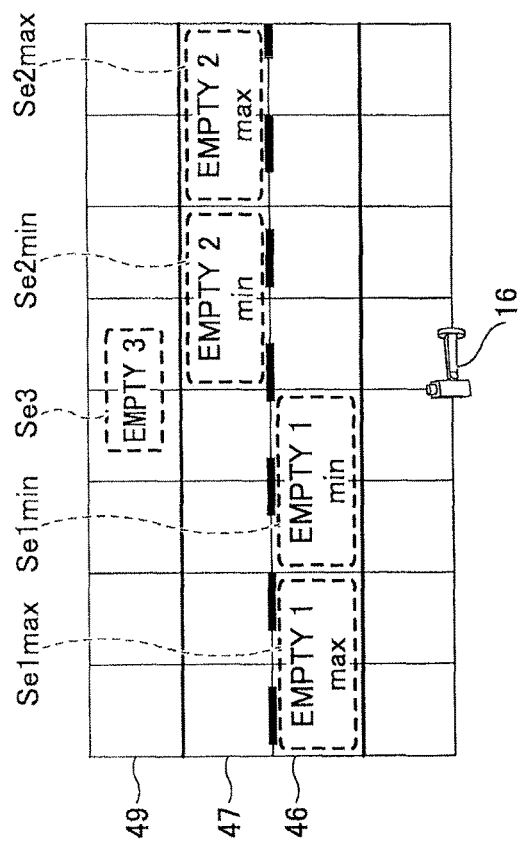
Figure 9A:
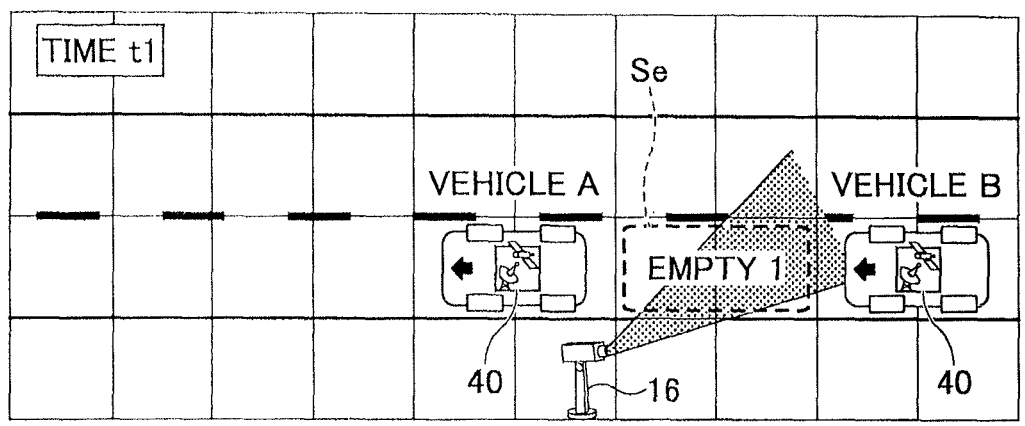
FIGS. 9A and 9B illustrate yet another example of a method of moving an empty area according to the present embodiment.
Figure 9B:
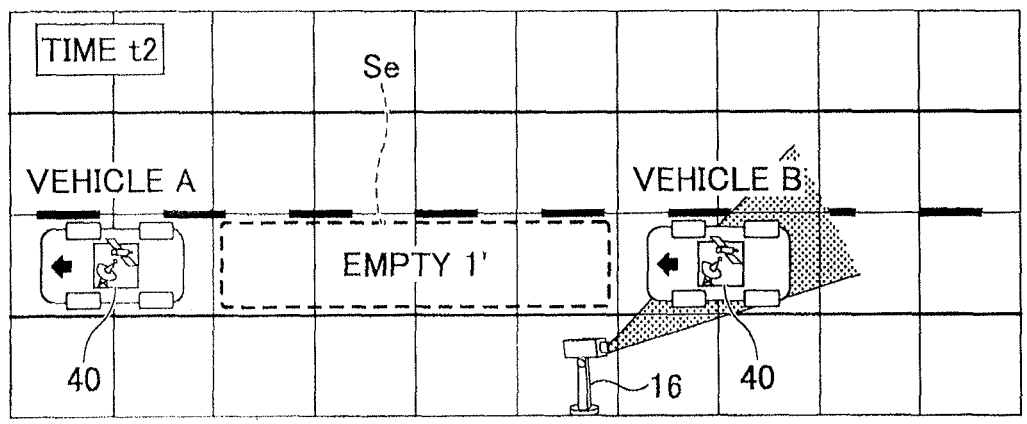

FIGS. 7A-7C illustrate one example of a method of moving an empty area according to the present embodiment. FIGS. 8A and 8B illustrate another example of a method of moving an empty area according to the present embodiment. FIGS. 9A and 9B illustrate yet another example of a method of moving an empty area according to the present embodiment. Note that in FIGS. 7A-7C, each of the left drawings schematically illustrates a situation of the vehicle 20, and each of the right drawings schematically illustrates a situation recognized by the center 14.

For example, as shown in FIG. 7A, at a time t1, the respective GPS apparatuses 40 included in two vehicles A and B detect their self-position information. If it is determined that no object is present in the area between the vehicle A and the vehicle B that is the monitoring target area of the sensor 16 installed at a side of a road, this monitoring target area is determined as an initial position of an empty area Se1. It will now be assumed for a comparison purpose that, different from the present embodiment, an empty area Se1 between the vehicles A and B is not moved even while the vehicles A and B are moving. In this comparison example, after the above-mentioned setting (determination) of the empty area Se1, if there are neither the sensor 16 nor the on-vehicle sensor of another vehicle having the monitoring target area between the vehicle A and the vehicle B, the area between the vehicles A and B becomes an unknown area Su at a time t2 (FIG. 7B). In contrast thereto, according to the present embodiment, after the above-mentioned setting (determination) of the empty area Se1, the empty area Se1 is moved with time in synchronization according to the speeds of the vehicles A and B. Thereby, even at a time t2, the area between the vehicles A and B is kept as the empty area Se1 (FIG. 7C).

For example, as shown in FIG. 8A, if it is determined that no object is present in a monitoring target area under a condition where the monitoring target area of the sensor 16 installed at a side of a road includes parts of two lanes 46 and 47 having opposite traveling directions and a part of a sidewalk, the monitoring target area is determined as an initial position of an empty area Se. After a period of time T (seconds) elapses, an empty area Se1 that is set on the nearer lane 46 is moved at a speed range between the legal lower limit "min" and the legal upper limit "max" ("Se1min" through "Se1max"), an empty area Se2 that is set on the farther lane 47 is moved at a speed range between the legal lower limit "min" and the legal upper limit "max" ("Se2min" through "Se2max"), and an empty area Se3 that is set on the sidewalk 49 is reduced (FIG. 8B). FIG. 8B illustrates a state estimated to appear after the period of time T (seconds).

For example, as shown in FIG. 9A, a case will be assumed where, at a time t1, the GPS apparatuses 40 respectively included in two vehicles A and B detect their self-position information, and it is determined that no object is present in the area between the vehicles A and B that is the monitoring target area of the sensor 16 installed at a side of a road. In this case, this monitoring target area is determined as an initial position of an empty area Se. Thereafter, at a time t2, the empty area Se is moved at the speed of the vehicle A and the speed of the vehicle B, and is elongated or shortened so as to correspond to the area between the vehicles A and the vehicle B (FIG. 9B).

The removing process/movement estimation part 36 removes an empty area Se: when a predetermined period time has elapsed since the empty area Se was detected on a sidewalk; when the empty area Se being moved on the road map has passed through an unknown area where the empty area Se merges with another road; when a vehicle that has been moving in front of the empty area Se has stopped or a predetermined period of time has elapsed since the stoppage; when concerning the empty area Se sandwiched between two vehicles, the speed difference or the distance between the two vehicles has become greater than or equal to a predetermined amount; and/or the like.

After thus moving or removing an empty area stored in the position information database 30, the removing process/movement estimation part 36 stores, in the position information database 30, the estimated position information after thus moving the empty area, or the removing information.

The on-vehicle apparatus 12 of each vehicle 20 is capable of connecting to the position information database 30 of the center 14 via radio communication. The position information of a presence area where an object detected by the sensor 16 or the vehicle 20 is present, and the position information of an empty area where it is determined that no object is present, stored in the database 30, is supplied to the vehicle 20. It is sufficient that this operation of supplying the information is carried out every predetermined period of time. Note that it is possible that also the position information of an unknown area is supplied to the vehicle 20.

The on-vehicle apparatus 12 is capable of automatically moving (automatically driving) the vehicle, or providing information concerning a situation of the vehicle (relationships with another vehicle, a person, or so) to the driver with a display or a sound. That is, the on-vehicle apparatus 12 is capable of carrying out automatic traveling through engine control, motor control, braking control, steering control, and so forth, and giving an approach alarm, a buzzer alarm, a driving operation instruction, and so forth, to the driver via a sound or a display.

The on-vehicle apparatus 12 includes an ECU 48 mainly including a microcomputer. When having received the position information of a presence area where an object is present and the position information of an empty area from the center 14, the ECU 48 first calculates the probability that the vehicle will collide with the object. Actually, if the vehicle is likely to enter the presence area, the on-vehicle apparatus 12 determines the collision probability with the object as a value near 100%. If the vehicle is likely to enter the empty area, the on-vehicle apparatus 12 determines the collision probability with the object as a value near 0%. Note that, the greater the time or the distance becomes for which the empty area has been moved from the initial position, the greater such a probability becomes that the object is present in the empty area. Therefore, it is possible that, the greater the moving time or the moving distance of the empty area becomes, the more the collision probability with the object is gradually increased.

Thus, the ECU 48 causes the vehicle to automatically travel in such a manner as to avoid a collision with an object that has a collision probability greater than a predetermined value, based on the collision probability with the object. Actually, the ECU 48 causes the vehicle to automatically travel in such a manner as to enter an empty area where the collision probability decreases to be less than the predetermined value, or carries out driving support control to show the driver the timing to be able to enter the empty area.

FIGS. 10A-10D illustrate a method of controlling support of driving a vehicle according to the present embodiment.

Figure 10A:
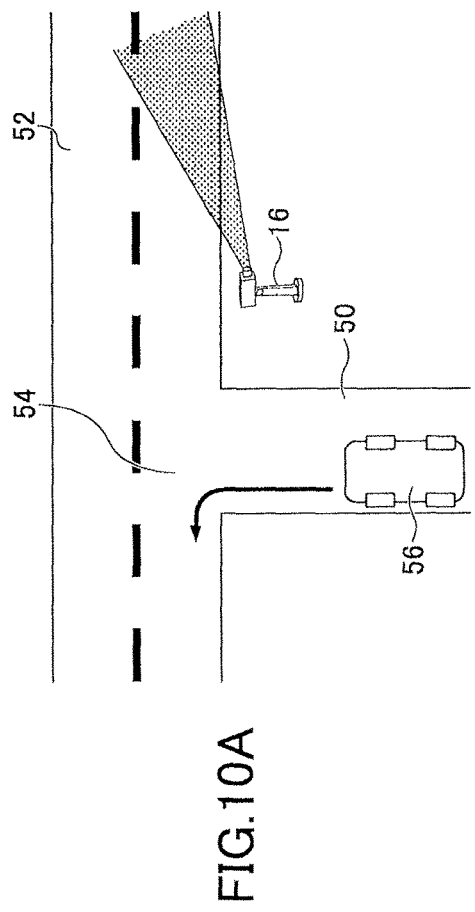
FIGS. 10A-10D illustrate a method of controlling support of driving a vehicle according to the present embodiment.

For example, as shown in FIG. 10A, such a road situation will now be assumed where a road 50 where a vehicle is allowed to travel merges with a road 52 at a junction 54, and the sensor 16 installed at a side of the road 52 has its monitoring target area corresponding to a part of the road 52 in front of the junction 54. In this situation, a case will now be considered where a vehicle 56 traveling on the road 50 is entering the road 52 at the junction 54.

Figure 10D:
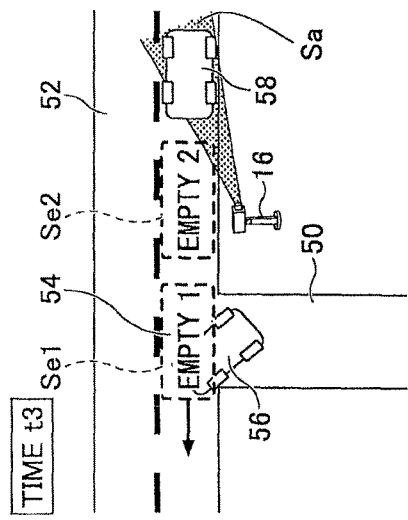
Figure 10C:
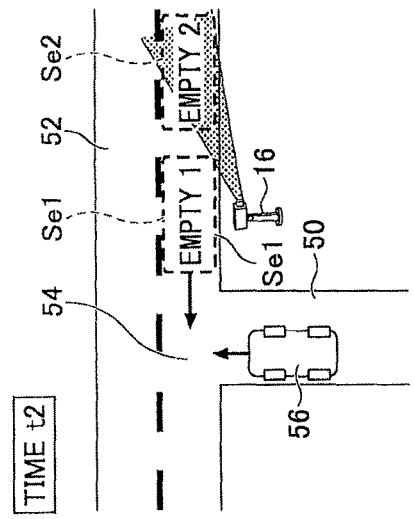
Figure 10B:
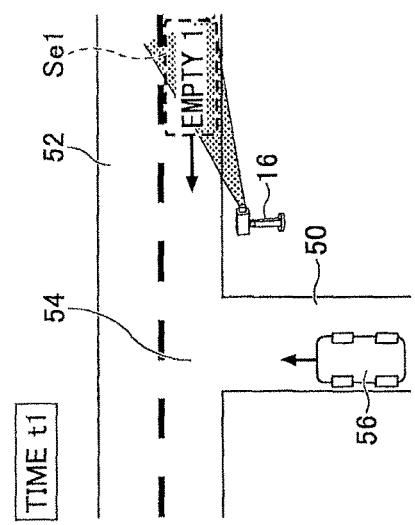

In this case, if it is determined that, at a time t1, no object is present in the monitoring target area of the sensor 16, the monitoring target area is determined as an initial position of an empty area Se1 (FIG. 10B). Thereafter, if it is determined that, at a time t2, still no object is present in the monitoring target area of the sensor 16, the above-mentioned empty area Se1 reaches such a position that the initial position at the time t1 has been moved at, for example, the legal speed upper limit of the road 52, and the monitoring target area of the sensor 16 is determined as an initial position of an empty area Se2 (FIG. 10C).

Then, when the empty area Se1 on the road 52 reaches the junction 54 at a time t3, the collision probability with an object at the junction 54 becomes less. Therefore, the ECU 48 of the on-vehicle apparatus 12 of the vehicle 56 on the road 50 in front of the junction 54 carries out automatic traveling or driving support control showing the timing to enter the junction to the driver, in such a manner that the vehicle 56 will enter the junction 54 at which the empty area Se1 reaches at the time t3 and travel on the road 52 while avoiding a collision with an object (FIG. 10D).

Even if the vehicle 56 does not enter the junction 54 when the empty area Se1 reaches the junction 54, the collision probability with an object at the junction 54 is still kept less also when the empty area Se2 on the road 52 reaches the junction 54 thereafter. Therefore, it is possible that the ECU 48 of the on-vehicle apparatus 12 of the vehicle 56 carries out automatic traveling or driving support control showing the timing to enter the junction 54 to the driver, in such a manner that the vehicle 56 will enter the junction 54 at which the empty area Se2 reaches and travel on the road 52 while avoiding a collision with the object.

Note that, if a vehicle 58 enters the monitoring target area of the sensor 16 at the above-mentioned time t3, the monitoring target area is determined as a presence area Sa (FIG. 10D). Then, if the vehicle 56 does not enter the junction 54 each time when the empty area Se1 or Se2 reaches the junction 54 and thereafter the presence area Sa on the road 52 reaches the junction 54, the collision probability with an object at the junction 54 becomes greater. Therefore, the ECU 48 of the on-vehicle apparatus 12 of the vehicle 56 on the road 50 in front of the junction 54 carries out driving support control, in such a manner as to prevent the vehicle 56 from entering the junction 54 at which the presence area Sa reaches to avoid a collision with the object in the presence area Sa.

Thus, in the vehicle driving support system 10 according to the present embodiment, it is possible that, while detecting a presence area using the sensor 16 where a vehicle or a person is present, the monitoring target area of the sensor 16 or so included in the other-than-presence area (other than the thus detected presence area) is set as an initial position of an empty area, and the empty area is propagated or moved with time on the road map. Thus, by extracting an empty area at which it is determined that no object is present included in the other-than-presence area, it is possible to manage the other-than-presence area in such a manner as to classify the other-than-presence area as an empty area(s) and an unknown area(s) where whether an object is present is unknown. Also, the on-vehicle apparatus 12 is capable of carrying out such driving support control as to guide the vehicle neither to a presence area where the collision probability is greater nor to an unknown area where whether an object is present is unknown but guide the vehicle to an empty area where the collision probability is less.

The above-mentioned driving support control gives priority to an empty area in comparison to an unknown area, and also, inhibits or restricts a vehicle's traveling into an unknown area while allowing the vehicle to travel into an empty area. It is also possible that the driving support control causes a vehicle to travel into an unknown area while reducing the vehicle speed to a safe speed (i.e., at a slow speed or the zero speed).

It is possible to appropriately guide a vehicle to cause it to travel, because the likelihood that the vehicle collides with an object is very small when the vehicle enters an empty area. Thus, the vehicle driving support system according to the present embodiment guides a vehicle to an empty area that is distinguished from an unknown area both included in an other-than-presence area (i.e., an area other than a presence area where an object is present). Thus, it is possible to carry out driving support control at a higher grade than a comparison example of merely guiding a vehicle not to enter a presence area where an object is present so as to avoid colliding with the object in the presence area.

Note that, in the above-mentioned embodiment, the sensor 16, the GPS apparatus 40, and the radar apparatuses 42 and 44 are examples of a "detection part". The identification part 32 in the center 14 is one example of an "area classification part". The ECU 48 of the on-vehicle apparatus 12 is one example of a "control part".

In the above-mentioned embodiment, the monitoring target area of the sensor 16 or so, included in an area other than a presence area where an object detected by the sensor 16 or so is present, is set as an initial position of an empty area, and the remaining area is set as an unknown area. However, there may be a case where the sensor 16 or so cannot monitor its own monitoring target area due to a presence of an object in a presence area or so. Therefore, it is also possible that, in consideration that even the monitoring target area of the sensor 16 or so can include an unknown area, the unknown area is moved with time on the road map in the same manner as an empty area.

FIGS. 11A-11F illustrate one example of a method of moving an empty area and an unknown area according to a variant.

Figure 11C:
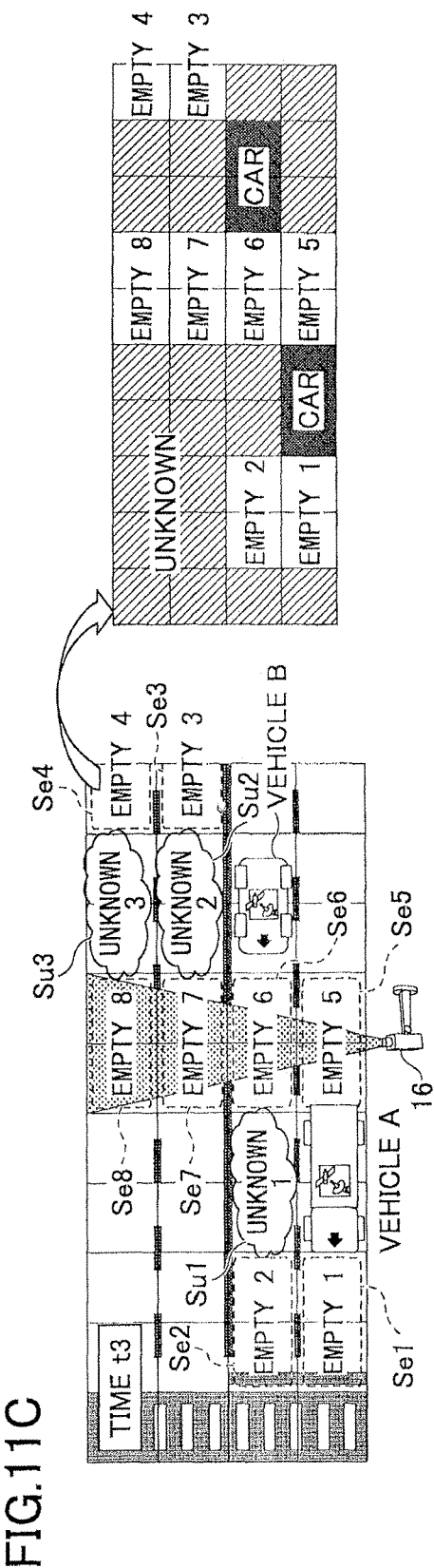

For example, as shown in FIGS. 11A-11F, a case will now be assumed where the monitoring target area of the sensor 16 installed at a side of a road includes two lanes 60 and 62 of one direction and two lanes 64 and 66 of the opposite direction of the road, and each vehicle traveling on the road includes the GPS apparatus 40. In such a situation, if, at a time t1, the GPS apparatus 40 installed in a vehicle A detects its position information, and it is determined that no object is present in the monitoring target area of the sensor 16, this monitoring target area is determined as initial positions of empty areas Se1, Se2, Se3, and Se4 for the respective lanes 60, 62, 64 and 66 (FIG. 11A).

Thereafter, the empty areas Se1, Se2, Se3, and Se4 on the respective lanes 60, 62, 64 and 66 are moved with time in their respective traveling directions. Then, if, at a time t2, the vehicle A travels on the lane 60 nearest to the sensor 16 and hides the monitoring target area of the sensor 16 on the lanes 62, 64 and 66, the monitoring target area on these three lanes 62, 64 and 66 other than the nearest lane 60 included in the monitoring target area of the sensor 16 are determined as unknown areas Su1, Su2 and Su3, respectively (FIG. 11B).

Thereafter, the empty areas Se1, Se2, Se3 and Se4, and the unknown areas Su1, Su2, and Su3 on the respective lanes 60, 62, 64 and 66 are moved with time in the respective traveling directions of the lanes 60, 62, 64 and 66. Then, if, at a time t3, the vehicle A exits the monitoring target area of the sensor 16, the monitoring target area of the sensor 16 is determined as initial positions of empty areas Se5, Se6, Se7 and Se8 for the respective lanes 60, 62, 64 and 66 (FIG. 11C).

Figure 11D:
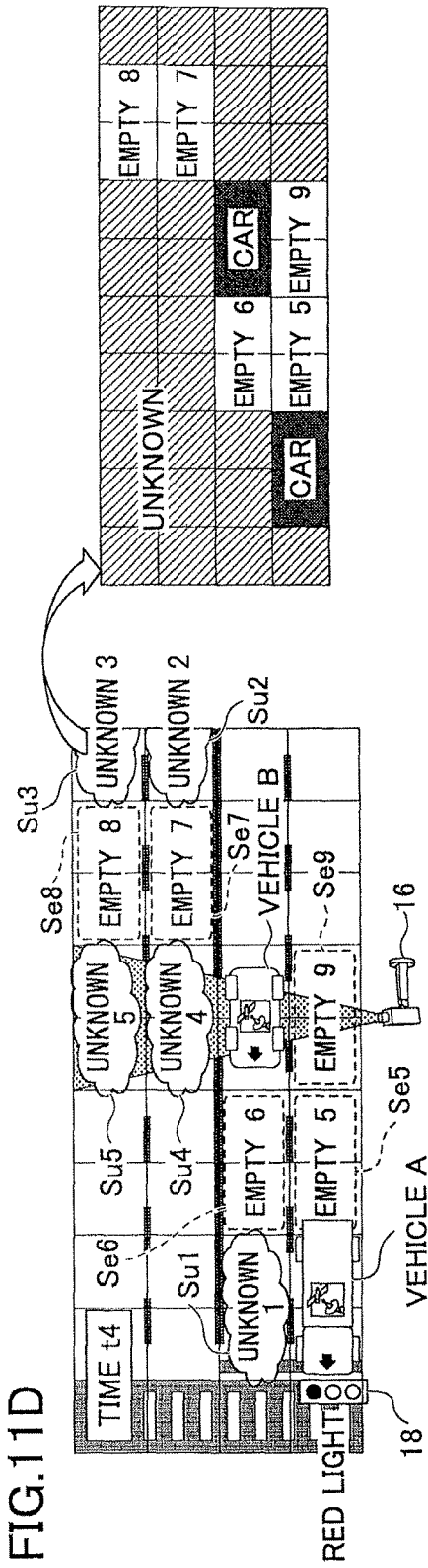

Thereafter, the empty areas and the unknown areas on the respective lanes 60, 62, 64 and 66 are moved with time in the respective traveling directions the lanes 60, 62, 64 and 66. Then, if, at a time t4, the vehicle A reaches a position where a road signal 18 turns red prohibiting entry and the movement of the empty area Se1 is stopped, the position at which the movement of the empty area Se1 is thus stopped is switched from the empty area Se1 to a presence area Sa of the vehicle A. Further, if the unknown area Su1 reaches a position where the movement of the empty area Se2 is stopped, the position at which the movement of the empty area Se2 is thus stopped is switched from the empty area Se2 to the unknown area Su1. Also, if, at the time t4, a vehicle B travels in the lane 62 (the second lane 62) second from the side of the sensor 16 and hides the monitoring target area of the sensor 16 on the lanes 64 and 66 farther from the sensor 16 than the second lane 62, the monitoring target area on the nearest lane 60 included in the monitoring target area of the sensor 16 is determined as an empty area Se9, and the monitoring target area on the lanes 64 and 66 farther from the sensor 16 than the second lane 62 included in the monitoring target area of the sensor 16 are determined as unknown areas Su4 and Su5, respectively (FIG. 11D).

Thereafter, the empty areas and the unknown areas on the respective lanes 60, 62, 64 and 66 are moved with time in the respective traveling directions of the lanes 60, 62, 64 and 66. Then, even if, at a time t5, the empty area Se5 reaches the presence area Sa of the vehicle A, the empty area Se5 is removed because the vehicle A there is detected by its own GPS apparatus 40. Also, even if the empty area Se6 reaches the unknown area Su1, the empty area Se6 is removed because there is likelihood that an object is present in the unknown area Su1. Further, if, at the time t5, the vehicle B exits the monitoring target area of the sensor 16, the monitoring target area of the sensor 16 is determined as initial positions of empty areas Se10, Se11, Se12 and Se13 for the respective lanes 60, 62, 64 and 66 (FIG. 11E).

Thereafter, the empty areas and the unknown areas on the respective lanes 60, 62, 64 and 66 are moved with time in the respective traveling directions of the lanes 60, 62, 64 and 66. Then, if, at a time t6, the vehicle B reaches the unknown area Su1, the unknown area Su1 is removed because the vehicle B there is detected by its own GPS apparatus 40, and the position of the removed unknown area Su1 is switched into a presence area Sa of the vehicle B. Further, if, at the time t6, no object is present in the monitoring target area of the sensor 16, the monitoring target area of the sensor 16 is determined as initial positions of empty areas Se14, Se15, Se16, and Se17 for the respective lanes 60, 62, 64 and 66 (FIG. 11F).

According to the variant, it is possible that, while detecting a presence area using the sensor 16 or so where a vehicle or a person is present and an unknown area where whether an object is present is unknown, the monitoring target area of the sensor 16 or so included in the other-than-presence area (i.e., the area other than the presence area where an object is present) is determined as an initial position(s) of an empty area(s) or an unknown area(s), and the empty area(s) and the unknown area(s) are propagated or moved with time on the road map. Then, it is possible to carry out such driving support control as to guide a vehicle neither to the presence area where the collision probability is greater nor to the unknown area where whether an object is present is unknown but guide the vehicle to the empty area where the collision probability is less. Therefore, also the variant can carry out high-grade driving support control by guiding a vehicle to the empty area distinguished from the unknown area both included in the other-than-presence area (i.e., the area other than the presence area where an object is present).

In the above-mentioned embodiments, while a vehicle is guided to an empty area where it is detected that no object is present, the vehicle is not guided to an unknown area where whether an object is present is unknown. However, the present invention is not limited thereto. It is sufficient that an empty area is given priority as an area where a vehicle travels than an unknown area, and it is also possible that a vehicle is guided to an unknown area. For example, it is also possible that, as a specific manner of guiding a vehicle to an unknown area, a slow driving manner is recommended to the vehicle driver or the vehicle driver's attention is called. It is also possible that, if it is unavoidable to enter an unknown area during automatic driving (automatic traveling), the vehicle driving is switched from the automatic driving to manual driving by the driver.

According to the embodiments, it is possible to provide vehicle driving support systems capable of carrying out high-grade driving support control by guiding a vehicle to an empty area, distinguished from an unknown area, both included in an other-than-presence area (i.e., an area other than a presence area where an object is present).

Thus, the vehicle driving support systems have been described in the embodiments. However, the present invention is not limited to these embodiments. Various modifications and/or implements such as combinations with part of or all of another embodiment(s), a replacement(s) with part of another embodiment(s), and so forth, can be made within the scope of the present invention.

The present application is based on and claims the benefit of priority of Japanese Priority Application No. 2015-026913, filed on Feb. 13, 2015, the entire contents of which are hereby incorporated herein by reference.

What is claimed is:

1. A vehicle driving support system comprising:
a detection part configured for monitoring a target area and detecting whether an object is in the target area;
an area classification part comprising a processor configured to classify an area other than a presence area where the object detected by the detection part is present as an empty area or an unknown area, the empty area being such an area that it is determined that no object is present and an unknown area being such an area that whether an object is present is unknown, and classify an area other than the empty area and the presence area as the unknown area; and
a controller configured to guide a vehicle to the empty area, wherein
in response to the detection part not detecting the object in the target area, the target area is classified as the empty area,
the classified empty area is moved, along with movement of an own vehicle or another vehicle, to an area that is undetectable by the detection part,
after the processor classifies the empty area, continue moving the empty area into other areas to update the position of the classified empty area over time.

2. The vehicle driving support system as claimed in claim 1, wherein
the area classification part classifies a first area as the empty area, the first area being in between and adjacent to two of the presence areas where the detection part has respectively detected the objects moving in the same direction, and classifies an area other than the classified empty area and the presence area into the unknown area.

3. The vehicle driving support system as claimed in claim 1, wherein
the detection part is a sensor installed at a side of a road, a GPS apparatus located in another vehicle, or a radar apparatus in the vehicle.

4. The vehicle driving support system as claimed in claim 2, wherein
the detection part is a sensor installed at a side of a road, a GPS apparatus located in another vehicle, or radar apparatus in the vehicle.

5. The vehicle driving support system as claimed in claim 1, wherein the detection target area is classified as the unknown area after the predetermined period.

6. The vehicle driving support system as claimed in claim 1, wherein the classified empty area is moved based on known positions of presence areas that are also moving.

7. The vehicle driving support system as claimed in claim 1, wherein the classification of each empty area as the unknown area occurs in response to one of the following conditions:
1) a predetermined period elapses after a detection of the empty area on a sidewalk;
2) the empty area being moved passes through an unknown area where the area merges with another road;
3) a vehicle that has been moving in front of the empty are has stopped or a predetermined period of time has elapsed since the vehicle that has been moving in front of the empty area has stopped; or
4) the area is positioned between two vehicles and either a difference of speed of the two vehicles is greater or equal to a predetermined difference, or a distance between the two vehicles is greater than or equal to a predetermined distance.

* * * * *